2 Sheets, Sheet 1.
C. B. Rogers,
Sharpening Reciprocating Saws.
Nº 3,849.  Patented Dec. 7, 1844.
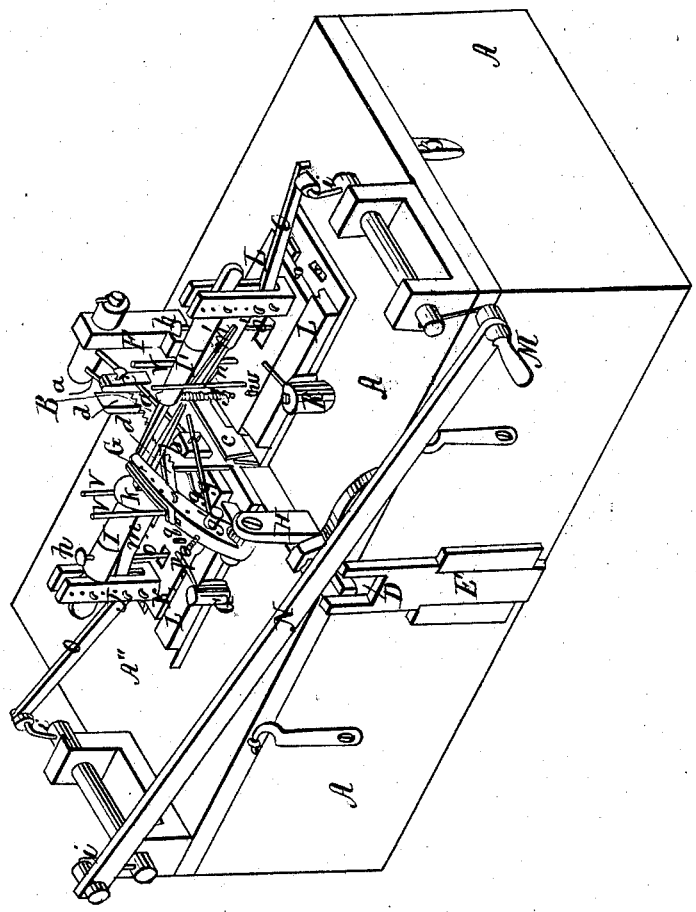
Fig: 1.

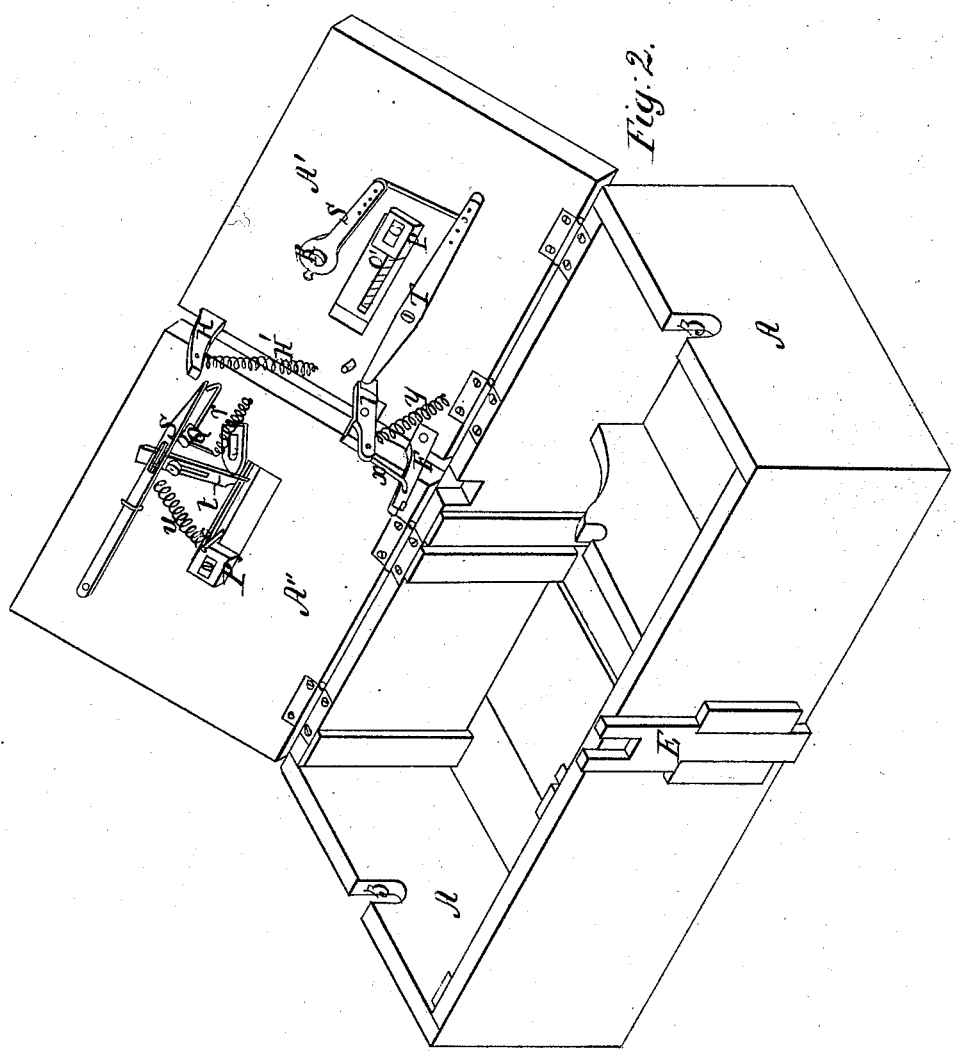

UNITED STATES PATENT OFFICE.

CALVIN B. ROGERS, OF SAYBROOK, CONNECTICUT.

MACHINE FOR FILING SAWS.

Specification of Letters Patent No. 3,849, dated December 7, 1844.

*To all whom it may concern:*

Be it known that I, CALVIN B. ROGERS, of Saybrook, in the county of Middlesex and State of Connecticut, have invented a new and useful Machine for the Purpose of Filing Saws and other Articles of Like Character; and I do hereby declare that the following is a full and exact description thereof.

In the accompanying drawing, Figure 1 is a perspective view of such of the operating parts of the machine that are on the top of the box, or case, A, A, which is the basis, or support, thereof; and Fig. 2 is a perspective view of those parts which are below the top of said box or case.

The saw, B, to be filed, is held by a clamp, C, which slides in a trough, D, situated between the two sections of the top, A′, A″, the lower edges of this clamp fitting and sliding, within said trough, which may be raised, or lowered, at pleasure, by two sliding pieces at its ends, one of which is shown at E. The upper edge of the saw is held between two clamps that are moved back and forth by the action of a vibrating post, or head, F, the lower portion of which is seen at F, in Fig. 2; this vibrating head works on a joint pin attached to the top A′; two rods, seen at $a, a$, are attached to and sustain two clasps, one of which is seen at $b$, that embrace the toothed edge of the saw between them; the rods $a, a$, spring together with considerable force, so as to hold the edge of the saw firmly, and by this means, as the post F, is moved back, the clasps $b$, cause the saw to recede along with the clamp C, that holds it below. The force with which the rods $a$, spring together may be regulated, or they may be entirely disengaged, by a thumb screw passing through a piece, $c$, and bearing against a piece, $d$, both of which are attached to the spring rods, $a$, for that purpose. When the post, F, moves forward, the clasps, $b$, slide on the sides of the saw, which is prevented from moving forward by a pawl, $d$, which may have two, three, or more teeth on it, and may be changed at pleasure; the teeth of this pawl fall into those of the saw, said pawl working on a joint pin in the piece G, affixed to a standard H, the distance of which from the saw may be regulated by a thumb screw, $e$, bearing against it, and passing through the block, $f$; the lower end of the standard, H, is shown in Fig. 2, with a spiral spring, H′, attached to it, and to the top, A′, to keep it to its bearing. There are two rods, $g, g$, which proceed from the piece G, and serve to aid in sustaining the clasps $b$, by passing through pins, or eyelets, on their sides, as shown in the drawing; the rods, $g, g$, are shown as attached to a roller $g'$, passing through the piece, G; the roller may be regulated by a set screw, which will thus regulate the situation of the rods $g, g$.

I, I′, are two files, with their handles; said handles are made in two parts, forming a pin and socket by which they may be changed, and set at any desired angle; they are kept in place by the thumb screws $h, h$. The handles of these files work on joint pins in the standards J, J. These standards are affixed to two sliding carriages, K, K′, that are guided by the grooved strips, L, L. The sliding carriages, K, K′, are moved back and forth by the winch, or crank, M, the connecting rod N, serving to communicate the motion of said winch to the cranks, $i, i, i$, which actuate the shackles O, O, attached to the sliding carriage, and cause them, alternately, to approach toward, and recede from, each other. The files may be forced down by a spring, or a weight, so as to cause it to bear upon the saw; the file I, is shown as drawn down by a spiral spring, $j$, and the file I, as having a lead weight at $k$. The files may be set at such rake as may be desired, which will be governed by the position of the sliding carriages; they are to be placed an even number of teeth apart, and always sufficiently far to give them, each, room to play. The file handles are guided in working up and down by vertical guide rods V, V. The files must, of course, be lifted from the saw to allow it to advance after the filing of two teeth. The levers $m, m$, are the lifting levers, and these work on joint pins in the standards J, J; one of these levers, $m'$, is represented as slit, and adjusted by a thumb screw, $n$; this, however, is not necessary to their action; $o, o'$, are rods attached to these levers, and, descending vertically, they pass through a slot in the sliding carriages, and also through the tops, A′, A″; they are, by the receding of the carriages, brought into contact with two adjustable stop pieces, P, P, below the tops, A, Fig. 2, and the files are thereby lifted. The files may be lifted, and made to rise from the work immediately the carriages begin to move back, by means of the stud, or post, Q, its wiper, p, and the pin q, on the carriage, and the parts connected with said post under the top, A″, as shown in Fig. 2. The post, Q, turns in the top A″, and has attached to it a rod, r, which when forced against a lever, s, will withdraw the sliding piece, t, and cause its point to leave the slot free along which the rod o, traverses; when this rod has moved forward of the point of the sliding piece, t, the wiper, p, escapes from the pin q, and by the action of the spring u, Fig. 2, the lever s, will be drawn forward, the point of t, will consequently be advanced, and the rod, o, being then at the fore end of the slot, will, immediately the carriage begins to retreat, be brought against the point of t, and the file will be lifted, and will continue up until t, is withdrawn by the disengaging of the wiper from the pin q, which takes place by the retreat of the carriage, when the file will fall.

The post, F, receives the motion by which the clasps b, are made to advance and retreat, in the following manner: R, is a post which turns in the top A′, and has projecting from it a wiper v, which is acted on by the pin w, in the sliding carriage, K; to the lower end of this post is affixed a rod, or lever, S, Fig. 2, which by its motion moves the lever T, and this the lever U; this latter is attached to the vibrating post, F, by the connecting rod x, which it draws forward at the proper time, while the spiral spring, y, serves to bring it back to its bearing when left free to return.

The above described machine may be used equally well for circular saws. When so used, the shaft of the saw may be made to occupy the hollows, z, z, Fig. 2, or such other bearings as may be adapted thereto. The trough, D, will then be dispensed with, and the edge of the saw be made to project up in the division between the two tops, or through an opening in a continuous top, where the machine is intended for circular saws only. By placing a toothed wheel, or a dividing plate, provided with a suitable number of divisions, teeth may be cut in a blank saw, should this be desired.

Having thus fully described the manner in which I construct my machine for filing saws, what I claim therein as new, and desire to secure by Letters Patent, is—

1. The manner in which I arrange, combine, and operate the vibrating carriages, the adjustable files, and the apparatus for lifting them in order to liberate the saw teeth from their action, as the saw is shifted.

2. I claim the manner in which I have arranged and combined the apparatus for shifting the place of the saw as the work proceeds, said apparatus consisting of the post R, and its appendages, the vibrating post, F, and the clasps b, with their spring rods, a, a, operating substantially as described.

3. I claim the general arrangement of the apparatus for lifting the files directly the carriages begin to recede, as connected with the post Q, and its appendages, and represented, principally, in Fig. 2.

And I do hereby declare that I do not intend by these claims to limit myself to the exact form, or arrangement, of the respective parts and combinations as herein described and represented, but to vary these as I may deem expedient, while such arrangement and combination are substantially the same with those herein fully made known.

CALVIN B. ROGERS.

Witnesses:
Thos. P. Jones,
Wm. Bishop.